(12) United States Patent
Lee et al.

(10) Patent No.: US 7,879,138 B2
(45) Date of Patent: Feb. 1, 2011

(54) PRESSURE SWING ADSORPTION METHOD AND SYSTEM WITH MULTIPLE-VESSEL BEDS

(75) Inventors: Sang Kook Lee, Breinigsville, PA (US); Justin David Bukowski, Lenhartsville, PA (US); Carolyn Taylor Zelson, Lansdale, PA (US); Mark Ephraim Levine, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 985 days.

(21) Appl. No.: 11/490,003

(22) Filed: Jul. 20, 2006

(65) Prior Publication Data
US 2008/0022851 A1    Jan. 31, 2008

(51) Int. Cl.
*B01D 53/02* (2006.01)
(52) U.S. Cl. .................. 95/96; 95/103; 95/130
(58) Field of Classification Search ............ 95/96, 95/103, 130
See application file for complete search history.

(56) References Cited

U.S. PATENT DOCUMENTS

| | | | |
|---|---|---|---|
| 4,725,293 | A | 2/1988 | Gunderson |
| 4,761,165 | A | 8/1988 | Stoecker et al. |
| 5,407,465 | A * | 4/1995 | Schaub et al. ............... 95/14 |
| 5,538,544 | A | 7/1996 | Nowobilski et al. |
| 5,656,068 | A | 8/1997 | Smolarek et al. |
| 5,759,242 | A | 6/1998 | Smolarek et al. |
| 6,051,050 | A | 4/2000 | Keefer et al. |
| 6,277,174 | B1 | 8/2001 | Neu et al. |
| 6,334,889 | B1 | 1/2002 | Smolarek et al. |
| 6,918,953 | B2 | 7/2005 | Lomax et al. |
| 7,445,660 | B2 * | 11/2008 | Hart et al. ............... 95/26 |
| 2003/0167920 | A1 | 9/2003 | De-Souza et al. |
| 2004/0055465 | A1 | 3/2004 | Guillard et al. |

(Continued)

FOREIGN PATENT DOCUMENTS

EP    1188471 A2    3/2002

(Continued)

OTHER PUBLICATIONS

Lu, Y., et al., "Tuning of Pressure Swing Adsorption Systems Based on Differential Pressure Profile", Adsorption: 11: pp. 315-324; 2005; Springer Science & Business Media, Inc.; Netherlands.

*Primary Examiner*—Robert A Hopkins
(74) *Attorney, Agent, or Firm*—John M. Fernbacher; Anne B. Kiernan

(57) ABSTRACT

Pressure swing adsorption process for the separation of a feed gas mixture comprising (a) providing a pressure swing adsorption system comprising one or more composite beds, each composite bed comprising adsorbent material disposed in two or more vessels in parallel flow configuration, each vessel having a feed end and a product end; (b) performing cyclic sequential steps comprising adsorption/make product, withdrawing gas at decreasing pressure from the composite bed, purging the composite bed, and introducing gas into the composite bed at increasing pressure; and (c) for any of the sequential steps, setting a flow rate or flow rates of one or more gases selected from the group consisting of gas introduced into or withdrawn from the feed end or ends of any of the two or more vessels and gas introduced into or withdrawn from the product end or ends of any of the two or more vessels.

12 Claims, 3 Drawing Sheets

U.S. PATENT DOCUMENTS

2006/0130651 A1    6/2006  Bizjak

FOREIGN PATENT DOCUMENTS

| | | |
|---|---|---|
| EP | 1 393 795 A | 3/2004 |
| JP | 63126519 | 5/1988 |
| JP | 62254955 | 4/1989 |
| JP | 2001327829 A | 11/2001 |
| WO | 2006076402 A2 | 7/2006 |

* cited by examiner

PRESSURE SWING ADSORPTION METHOD AND SYSTEM WITH MULTIPLE-VESSEL BEDS

BACKGROUND OF THE INVENTION

Pressure swing adsorption (PSA) is a well-known method for the separation of bulk gas mixtures and for the purification of gas streams containing low concentrations of undesirable components. The method has been developed and adapted for a wide range of feed gases, operating conditions, product purity, and product recovery. Many pressure swing adsorption systems utilize two or more parallel adsorbent beds operated in a cyclic sequence in order to maintain a constant product flow rate while selected beds undergo various steps including adsorption/make product, depressurization, evacuation, purge, pressure equalization, repressurization, and other related steps. Multiple adsorbent beds using numerous process steps are required to achieve high purity and/or recovery of valuable gaseous products such as hydrogen, carbon oxides, synthesis gas, light hydrocarbons, and the like. Multiple-bed PSA systems using these process steps also are applied in the recovery of oxygen from air for various industrial applications and for portable medical oxygen concentrators.

The proper selection and design of the adsorber vessels and beds is an important factor in minimizing capital cost and maximizing operating efficiency of PSA systems. Various types of designs have been used in the art to effect proper gas-adsorbent contact during the process steps, and most are designed for installation within cylindrical pressure vessels. Granular adsorbents are widely used and can be installed in cylindrical beds in which gas flows in the axial direction or in annular beds in which gas flows in the radial direction. Various methods have been used to support the beds of granular adsorbent in axial or radial flow configurations.

There is a continuing need in the adsorptive gas separation art for vessel designs that maximize the amount of fabrication work carried out in the shop and minimize the amount of fabrication and assembly work required during field installation. This requires adsorber vessels that can be shipped safely in nearly-complete form, preferably wherein the vessels are packed with adsorbent in the shop. There also is a need for bed designs that minimize the void volume (i.e., the empty volume not occupied by adsorbent) within adsorber vessels. Further, it is desirable to use adsorber designs and fabrication methods that ensure substantially identical performance of each adsorber bed in the operation of multiple-bed PSA systems. In addition, there is a need for improved design and operating methods for large PSA plants with gas production rates greater than the capacity of single-train systems that use adsorber vessels having the maximum shippable diameter.

These needs are addressed by the embodiments of the invention described below and defined by the claims that follow.

SUMMARY OF THE INVENTION

An embodiment of the invention is directed to a pressure swing adsorption process for the separation of a feed gas mixture containing two or more components, the process comprising
  (a) providing a pressure swing adsorption system comprising one or more composite beds, each composite bed comprising adsorbent material disposed in two or more vessels in parallel flow configuration, each vessel having a feed end and a product end;
  (b) performing cyclic sequential steps comprising
    (b1) introducing the feed gas mixture into the feed ends of two or more vessels of the composite bed and withdrawing product gas from the product ends of the two or more vessels of the composite bed,
    (b2) withdrawing gas at decreasing pressure from the feed ends of the two or more vessels of the composite bed,
    (b3) purging the composite bed by introducing purge gas into the product ends of the two or more vessels of the composite bed and withdrawing purge effluent gas from the feed ends of the two or more vessels of the composite bed, and
    (b4) introducing gas into the product ends and/or feed ends of the two or more vessels of the composite bed at increasing pressure; and
  (c) for any of the sequential steps, setting a flow rate or flow rates of one or more gases selected from the group consisting of
    (c1) gas introduced into the feed end or ends of any of the two or more vessels,
    (c2) gas introduced into the product end or ends of any of the two or more vessels,
    (c3) gas withdrawn from the feed end or ends of any of the two or more vessels, and
    (c4) gas withdrawn from the product end or ends of any of the two or more vessels.

The flow rate or flow rates may be set to maintain the values of selected control parameters for the two or more vessels such that
  (a) the absolute difference between the selected control parameters for any two of the two or more vessels is less than a predetermined value, or
  (b) the absolute difference between the selected control parameter from each of the two or more vessels of the composite bed and the average of the control parameters from each of the two or more vessels of the composite bed is less than a predetermined value,
wherein the control parameter for each vessel is selected from the group consisting of
  (1) the time-average concentration of a selected component in the product gas from the vessel;
  (2) the minimum or maximum concentration of a selected component in the product gas from the vessel;
  (3) the time-average of the concentration of a selected component in the purge effluent gas from the vessel;
  (4) the minimum or maximum concentration of a selected component in the purge effluent gas from the vessel;
  (5) the minimum or maximum concentration of a selected component in the void space of the adsorbent at a selected point in the vessel;
  (6) the differential pressure between two points in the vessel at a selected time during the sequential steps;
  (7) the minimum or maximum temperature at a selected point in the vessels during the sequential steps; and
  (8) the minimum or maximum pressure at a selected point in the vessel during the sequential steps.

Another embodiment of the invention includes a pressure swing adsorption system comprising one or more composite beds, each composite bed comprising adsorbent material and having a composite bed feed end and a composite bed product end, the one or more composite beds having a composite bed feed end manifold, and a composite bed product end manifold, wherein each of the one or more composite beds comprises two or more vessels arranged in parallel flow configuration having a vessel feed end manifold and a vessel product end manifold, each vessel containing a portion of the adsorbent material and having a vessel feed end and a vessel product end, wherein the composite bed feed end manifold of a composite bed is adapted to place the feed end of that composite bed in flow communication with the feed ends of the two or more vessels via the vessel feed end manifold, wherein the composite bed product end manifold is adapted to place the product end of that composite bed in flow communication with the product ends of the two or more vessels via the respective vessel product end manifold, and wherein (a) any vessel feed end manifold comprises one or more flow restriction devices, each device being adapted to set the gas flow rate into the feed end of a respective vessel and/or to set the gas flow rate withdrawn from the feed end of the respective vessel, and/or (b) any vessel product end manifold comprises one or more flow restriction devices, each device being adapted to set the gas flow rate into the product end of a respective vessel and/or to set gas flow rate withdrawn from the product end of the respective vessel.

Any the one or more flow restriction devices may be selected from the group consisting of orifices, adjustable valves, reduced-diameter pipe segments, and adjustable-stop check valves.

A related embodiment of the invention is a pressure swing adsorption system comprising two composite beds, each composite bed comprising adsorbent material and having a composite bed feed end and a composite bed product end, each composite bed having a composite bed feed end manifold, and a composite bed product end manifold, wherein each composite bed comprises 2 to 20 vessels arranged in parallel flow configuration having a vessel feed end manifold and a vessel product end manifold, each vessel containing a portion of the adsorbent material and having a vessel feed end and a vessel product end, wherein the composite bed feed end manifold of a composite bed is adapted to place the feed end of that composite bed in flow communication with the feed ends of the two or more vessels via the vessel feed end manifold, wherein the composite bed product end manifold is adapted to place the product end of that composite bed in flow communication with the product ends of the two or more vessels via the respective vessel product end manifold, and wherein each vessel feed end manifold comprises an orifice and/or each vessel product end manifold comprises an orifice.

Another related embodiment includes a pressure swing adsorption system comprising (a) one or more composite beds, each composite bed comprising adsorbent material and having a composite bed feed end and a composite bed product end;

(b) a composite bed feed end manifold adapted to introduce gas into the feed end of each composite bed and withdraw gas from the feed end of each composite bed;

(c) a composite bed product end manifold adapted to introduce gas into the product end of each composite bed and withdraw gas from the product end of each composite bed;

wherein each of the one or more composite beds comprises portions of the adsorbent material disposed respectively in two or more vessels in parallel flow configuration, each vessel having a feed end and a product end, wherein the two or more vessels include (d) a vessel feed end manifold in flow communication with the composite bed feed end manifold and adapted to divide the gas flow into the feed end of each composite bed into individual gas streams and introduce the individual gas streams into the two or more vessels, respectively, and to withdraw and combine individual gas streams from the two or more vessels to provide the gas flow from the feed end of the composite bed; and (e) a vessel product end manifold in flow communication with the composite bed product end manifold and adapted to divide the gas flow into the product end of each composite bed into individual gas streams and introduce the individual gas streams into the two or more vessels, respectively, and to withdraw and combine individual gas streams from the two or more vessels to provide the gas flow from the product end of the composite bed;

and wherein (i) the vessel feed end manifold comprises one or more flow restriction devices, each device being adapted to set a gas flow rate into the feed end of a respective vessel and to set a gas flow rate withdrawn from the feed end of the respective vessel, and/or (ii) the vessel product end manifold comprises one or more flow restriction devices, each device being adapted to set a selected gas flow rate into the product end of a respective vessel and to set a gas flow rate withdrawn from the product end of the respective vessel.

A further embodiment of the invention is related to a pressure swing adsorption process for the separation of a feed gas mixture containing two or more components, the process comprising (a) providing a pressure swing adsorption system comprising one or more composite beds, each composite bed comprising adsorbent material disposed in two or more vessels in parallel flow configuration, each vessel having a feed end and a product end;

(b) performing cyclic sequential steps comprising (b1) introducing the feed gas mixture into the feed ends of two or more vessels of a composite bed and withdrawing product gas from the product ends of the two or more vessels of the composite bed, (b2) withdrawing gas at decreasing pressure from the feed ends of the two or more vessels of the composite bed, (b3) purging the composite bed by introducing purge gas into the product ends of the two or more vessels of the composite bed and withdrawing purge effluent gas from the feed ends of the two or more vessels of the composite bed, and (b4) introducing gas into the product ends and/or feed ends of the two or more vessels of the composite bed at increasing pressure;

(c) selecting a control parameter; and (d) for any of the sequential steps, setting the flow rate or flow rates of one or more gases selected from the group consisting of (d1) gas introduced into the feed end or ends of any of the two or more vessels, (d2) gas introduced into the product end or ends of any of the two or more vessels, (d3) gas withdrawn from the feed end or ends of any of the two or more vessels, and (d4) gas withdrawn from the product end or ends of any of the two or more vessels, wherein the flow rate is set or the flow rates are set to maintain the values of the control parameter for selected vessels of the two or more vessels such that the absolute difference between the values for any two of the selected vessels is less than a predetermined value.

In this embodiment, the control parameter may be selected from the group consisting of (1) the time-average concentration of a selected component in the product gas from the vessel;

(2) the minimum or maximum concentration of a selected component in the product gas from the vessel;
(3) the time-average of the concentration of a selected component in the purge effluent gas from the vessel;
(4) the minimum or maximum concentration of a selected component in the purge effluent gas from the vessel;
(5) the maximum or minimum concentration of a selected component in the void space of the adsorbent at a selected point in the vessel;
(6) the differential pressure between two points in the vessel at a selected time during the sequential steps;
(7) the minimum or maximum temperature at a selected point in the vessels during the sequential steps; and
(8) the minimum or maximum pressure at a selected point in the vessel during the sequential steps.

Another further embodiment of the invention includes a pressure swing adsorption process for the separation of a feed gas containing two or more components, the process comprising
(a) providing a pressure swing adsorption system comprising one or more composite beds, each composite bed comprising adsorbent material disposed in two or more vessels in parallel flow configuration, each vessel having a feed end and a product end;
(b) performing cyclic sequential steps comprising
  (b1) introducing feed gas into the feed ends of two or more vessels of a composite bed and withdrawing product gas from the product ends of the two or more vessels of the composite bed,
  (b2) withdrawing gas at decreasing pressure from the feed ends of the two or more vessels of the composite bed,
  (b3) purging the composite bed by introducing purge gas into the product ends of the two or more vessels of the composite bed and withdrawing purge effluent gas from the feed ends of the two or more vessels of the composite bed, and
  (b4) introducing gas into the product ends and/or feed ends of the two or more vessels of the composite bed at increasing pressure;
(c) selecting a control parameter, a specific sequential step, and a gas stream entering any vessel or exiting any vessel during the specific sequential step;
(d) determining whether the control parameter increases or decreases when the flow rate is increased for the selected gas stream entering the vessel or exiting the vessel during the specific sequential step;
(e) while performing the cyclic sequential steps, determining the value of the control parameter for each vessel and the average value of the control parameter for all vessels of the composite bed; and
(f) if the control parameter increases when the flow rate of the gas stream entering or exiting a vessel is increased during the specific sequential step as determined in (d) and if the value of the control parameter for the selected vessel is greater than the average value of the control parameter for all vessels of the composite bed during the specific sequential step, decreasing the gas flow rate entering or exiting the selected vessel; or
(g) if the control parameter increases when the flow rate of the gas stream entering or exiting a vessel is increased during the specific sequential step as determined in (d) and if the value of the control parameter for a selected vessel is less than the average value of the control parameter for all vessels of the composite bed during the specific sequential step, increasing the gas flow rate entering or exiting the selected vessel; or
(h) if the control parameter decreases when the flow rate of the gas stream entering or exiting a vessel is increased during the specific sequential step as determined in (d) and if the value of the control parameter for a selected vessel is greater than the average value of the control parameter for all vessels of the composite bed during the specific sequential step, increasing the gas flow rate entering or exiting the selected vessel; or
(i) if the control parameter decreases when the flow rate of the gas stream entering or exiting a vessel is increased during the specific sequential step as determined in (d) and if the value of the control parameter for a selected vessel is less than the average value of the control parameter for all vessels of the composite bed during the specific sequential step, decreasing the gas flow rate entering or exiting the selected vessel.

In this embodiment, the control parameter may be selected from the group consisting of
(1) the time-average concentration of a selected component in the product gas from the vessel;
(2) the minimum or maximum concentration of a selected component in the product gas from the vessel;
(3) the time-average of the concentration of a selected component in the purge effluent gas from the vessel;
(4) the minimum or maximum concentration of a selected component in the purge effluent gas from the vessel;
(5) the maximum or minimum concentration of a selected component in the void space of the adsorbent at a selected point in the vessel;
(6) the differential pressure between two points in the vessel at a selected time during the sequential steps;
(7) the minimum or maximum temperature at a selected point in the vessels during the sequential steps; and
(8) the minimum or maximum pressure at a selected point in the vessel during the sequential steps.

DETAILED DESCRIPTION OF THE INVENTION

Figure 1:
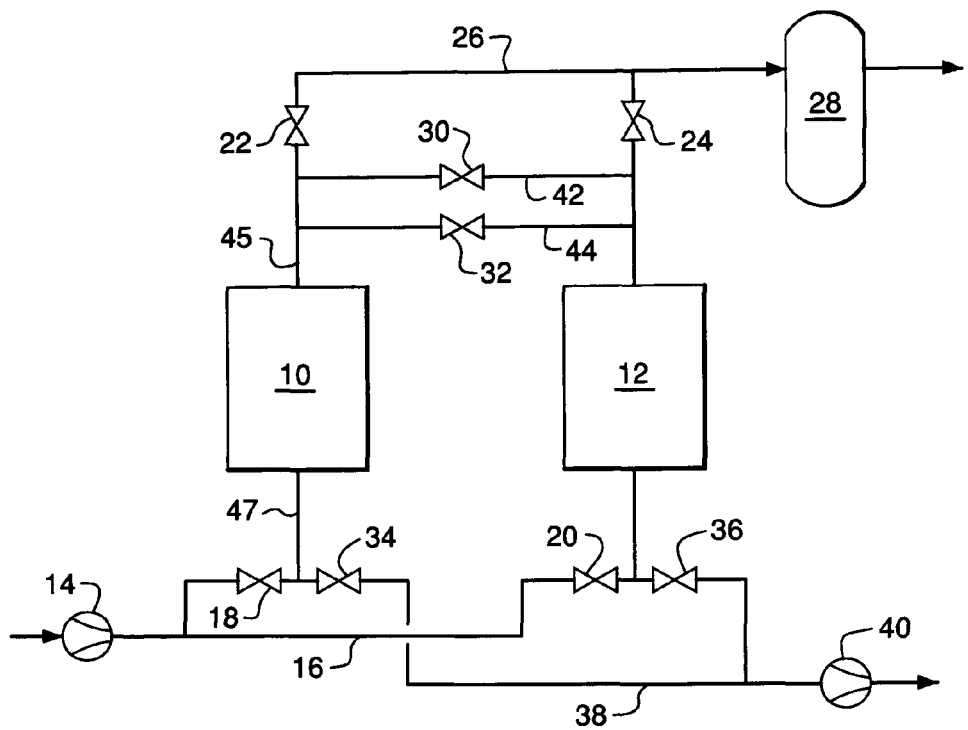
FIG. 1 is a schematic flow diagram of an exemplary pressure swing adsorption system.

Embodiments of the present invention include a pressure swing adsorption system comprising one or more composite beds, each composite bed comprising adsorbent material disposed in two or more vessels in parallel flow configuration, each vessel having a feed end and a product end. The pressure swing adsorption system using this configuration may be operated according to any cyclic PSA process that includes at least the steps of (1) introducing the feed gas mixture into the feed ends of two or more vessels of a composite bed and withdrawing product gas from the product ends of the two or more vessels of the composite bed, (2) withdrawing gas at decreasing pressure from the feed ends of the two or more vessels of the composite bed, (3) purging the composite bed by introducing purge gas into the product ends of the two or more vessels of the composite bed and withdrawing purge effluent gas from the feed ends of the two or more vessels of the composite bed, and (4) introducing gas into the product ends and/or feed ends of the two or more vessels of the composite bed at increasing pressure.

In the present disclosure, the term "bed" means a mass of adsorbent material installed in a single vessel into which gas is introduced and from which gas is withdrawn during the multiple steps of a cyclic PSA process according to methods known in the art. The term "composite bed" is defined herein as a total mass of adsorbent material that consists of two or more amounts of adsorbent material contained respectively in two or more parallel vessels. The total amount of adsorbent material in the composite bed is the sum of the amounts of adsorbent material contained in the two or more parallel vessels. The adsorptive material in the two or more parallel vessels is subjected collectively to the total gas inflow and outflow of the composite bed during the steps of the PSA cycle such that the adsorbent material in each vessel is subjected to the same process cycle step of the same duration in a given time period. The parallel vessels therefore operate synchronously throughout the steps in the PSA cycle.

The term "vessel" as used herein is a hollow structure enclosing an interior volume containing adsorbent material and having at least one gas inlet and at least one gas outlet. Multiple vessels are arranged in parallel flow configuration in which an inlet gas stream is divided into portions by an inlet manifold that directs the portions into respective vessels during steps in a PSA cycle. The outlet gas streams from each parallel vessel are combined into a single outlet gas stream by an outlet manifold. A manifold is generically defined as a piping assembly in which a single pipe is connected in flow communication with two or more pipes. The inlet gas stream passes into the composite bed collectively formed by the adsorbent material in the parallel vessels and the outlet stream is withdrawn from the composite bed collectively formed by the adsorbent material in the parallel vessels.

The term "in flow communication with" as applied to a first and second region means that gas can flow from the first region to the second region and from the second region to the first region through connecting piping and/or an intermediate region.

The generic term "pressure swing adsorption" (PSA) as used herein applies to all adsorptive separation systems that utilize the effect of pressure on adsorbent capacity to separate gas mixtures. The maximum pressure typically is superatmospheric, and the minimum pressure may be super-atmospheric, atmospheric, or sub-atmospheric. When the minimum pressure is sub-atmospheric and the maximum pressure is superatmospheric, the system typically is described as a pressure vacuum swing adsorption (PVSA) system. When the maximum pressure is near atmospheric pressure and the minimum pressure is below atmospheric pressure, the system is typically described as a vacuum swing adsorption (VSA) system.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

A bed of adsorbent material contained in a single vessel of a conventional PSA system may be replaced by a composite bed having two or more smaller portions of the adsorbent material disposed respectively in multiple vessels in various embodiments of the present invention. Each of the multiple vessels of the composite bed may have a smaller volume and/or a smaller diameter than the single vessel. The multiple vessels may be essentially the same size and shape, or alternatively may be different sizes and/or shapes if desired. The multiple vessels may contain essentially the same amount of adsorbent material or may contain different amounts of adsorbent material. The multiple vessels of the composite bed are operated in parallel wherein the flow of gas to the composite bed is divided and introduced into the multiple vessels and the streams of gas from the multiple vessels are combined to provide the total gas flow from the composite bed. Each of the multiple vessels contains a portion of the total adsorbent contained in the composite bed wherein the total amount of adsorbent in the multiple vessels may be less than, equal to, or greater than the total amount of adsorbent in the single-vessel bed that was replaced by the composite bed.

The use of multiple parallel vessels containing portions of adsorbent that function as a composite bed has several advantages. Several small diameter vessels will have less total void volume than a single large diameter vessel with a similar adsorbent volume, adsorbent layer thickness, and vessel head shape. The smaller vessels can be mass produced in the shop, shipped more easily than large diameter vessels, and loaded with adsorbent under a controlled environment prior to shipment to the installation site.

The advantages of PSA systems with composite beds may be offset by potential operating problems. For example, when each composite bed comprises adsorbent disposed in multiple vessels that are substantially identical, the arrangement of piping and machinery may lead to differences in the gas flows to or from individual vessels. The performance of any individual vessel containing a portion of the of the composite bed of adsorbent material therefore may vary from the performance of other vessels, and the overall performance of the composite bed may be reduced relative to the case in which all the vessels have identical performance. Another potential problem is that undesired variations in vessel fabrication, adsorbent quality, and adsorbent loading may cause the adsorption performance of individual vessels to differ, again leading to poorer overall performance. In another possible operating scenario, the substantially equivalent adsorption performance of multiple vessels in a composite bed may change over time such that the performance of the vessels is no longer equivalent.

In an operating PSA system, it may be necessary to increase the adsorption capacity of the existing system by installing additional parallel vessels to one or more composite beds. It may be difficult or impossible to match the adsorption performance of the new vessel or vessels to the performance of the existing vessels of a composite bed.

For conventional multiple-bed PSA systems in which each bed of adsorbent is installed in a single vessel, differences between the performance of the beds can be compensated for methods known in the art. These methods compensate for the operating asymmetry that exists between the beds by making changes in the length of time each bed undergoes a particular cycle step, by manipulating control valves to adjust the flow of gas to, from, or between the beds, or by other means.

The prior art does not teach methods for operating a PSA system to compensate for performance differences among multiple parallel vessels of a composite bed wherein each parallel vessel contains adsorbent material and the total adsorbent material in the parallel vessels operates as a composite bed in a cyclic PSA process.

The embodiments of the invention described below address these problems by setting the gas flow rates to and/or from each vessel selectively for one or more of the process steps in the PSA cycle. The performance of each vessel of a composite bed thus can be tuned as needed to maximize the performance of the PSA system.

The use of composite beds as described herein may be applied to any PSA system operated according to any PSA process cycle for the separation of any gas mixture. The embodiments of the invention may be illustrated, for example, by the operation of a two-composite bed VSA system of FIG. 1 for the recovery of oxygen from air using the process cycle of FIG. 2 as described below.

In a conventional PSA system, adsorbent material is contained in beds 10 and 12 with suitable means for introducing feed air into the bottom or feed end of each composite bed and withdrawing product gas from the top or product end of each composite bed. Each of beds 10 and 12 is contained in a single pressure vessel by means known in the art. In the illustration of an embodiment of the present invention, each of conventional beds 10 and 12 is replaced by separate amounts of adsorbent material disposed in two or more respective parallel vessels to form a composite bed as described in more detail below.

Figure 2:
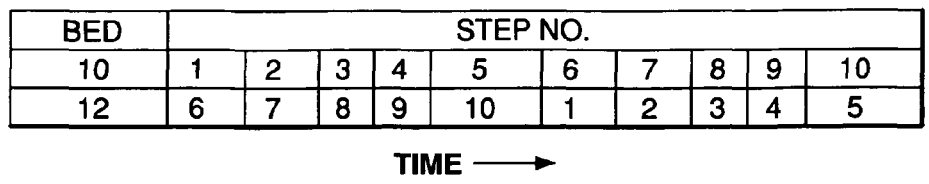
FIG. 2 is a cycle chart of a process that may be operated using the system of FIG. 1.

In the illustration of an embodiment of the invention according to FIG. 1, ambient air is compressed in feed air blower 14 and delivered into feed manifold 16. During the first step of the cycle, the adsorption/make product step, valve 18 is open to admit compressed air into composite bed 10 via line 47. The air passes into composite bed 10, wherein the moisture in the air is removed in a first layer of desiccant such as 13-X molecular sieve. The dry air then passes up through a layer of nitrogen selective adsorbent such as LiLSX molecular sieve, upon which nitrogen is adsorbed from the air. The product gas, now enriched in oxygen, passes through line 45 and valve 22 and into product manifold 26. The product flows through the buffer tank 28 and thence to a point of use. Additional equipment (not shown) may be included after the buffer tank outlet for flow control, product analysis, or other purposes.

During the second step of the cycle, the adsorption/make product/provide purge step, valve 30 is also opened to allow a portion of the product gas from composite bed 10 to flow into composite bed 12. This gas acts as a purge flow for composite bed 12, which at the time is being evacuated through valve 36 and manifold 38 by vacuum blower 40. After some time, the adsorbent in composite bed 10 is near its adsorptive capacity for nitrogen such that further air feed would cause nitrogen to breakthrough into the oxygen product stream. During the third step of the cycle, the provide purge step, valves 18, 22 and 30 are closed and valve 32 is opened to provide a higher flow of gas to purge composite bed 12. At this time feed blower 14 may be idled until it is required to provide feed air to one of the composite beds.

During the fourth step of the cycle, the provide pressure transfer step (sometimes termed the provide pressure equalization step), valve 36 is closed and valve 34 is opened to depressurize composite bed 10 through the vacuum blower. The flow of gas through valve 32 continues to repressurize composite bed 12. During the fifth step of the cycle, the first evacuation step, valve 32 is closed and composite bed 10 is evacuated to remove the adsorbed nitrogen. In the sixth step, the second evacuation step, the valve positions of composite bed 10 do not change. The sixth step is identified separately from the fifth step because there are changes in the valve positions for composite bed 12. In the seventh step, the first receive purge step, valve 30 also is opened to provide purge gas from composite bed 12, which is undergoing the second step of the cycle. In the eighth step, the second receive purge step, valve 30 is closed and valve 32 is opened to provide a higher purge flow to composite bed 10. In the ninth step of the cycle, the receive pressure transfer step (sometimes termed the provide pressure equalization step) valve 34 is closed and the gas from composite bed 12 begins to repressurize composite bed 10. In the tenth and final step of the cycle, the feed pressurization step, valve 32 is closed and valve 18 is opened to repressurize composite bed 10 with feed air from feed blower 14.

The cycle for composite bed 12 comprises the same steps performed out of phase with the cycle on composite bed 10 by one half of the total cycle time. The relative time relationships among steps 1 through 10 for composite beds 10 and 12 is given in the cycle chart of FIG. 2. The total cycle time may range between 40 and 80 seconds. The positions of the valves during the steps of the cycle are given in Table 1.

TABLE 1

Valve Chart

| Composite bed 10 | Feed Valve | | Evac. Valve | | Product Valve | | Purge Valve | | Composite bed 12 |
|---|---|---|---|---|---|---|---|---|---|
| Step | 18 | 20 | 34 | 36 | 22 | 24 | 30 | 32 | Step |
| 1 | O | C | C | O | O | C | C | C | 6 |
| 2 | O | C | C | O | O | C | O | C | 7 |
| 3 | C | C | C | O | C | C | C | O | 8 |
| 4 | C | C | O | C | C | C | C | O | 9 |
| 5 | C | O | O | C | C | C | C | C | 10 |
| 6 | C | O | O | C | C | O | C | C | 1 |
| 7 | C | O | O | C | C | O | O | C | 2 |
| 8 | C | C | O | C | C | C | C | O | 3 |
| 9 | C | C | C | O | C | C | C | O | 4 |
| 10 | O | C | C | O | C | C | C | C | 5 |

O = open
C = closed

As the size of a conventional PSA system is scaled up, the design of the adsorption vessels may become problematic because of fabrication issues or other limiting factors. In such a case, according to embodiments of the present invention, the system may be designed with at least one composite bed having several smaller vessels installed in parallel containing adsorbent material that functions as the composite bed. The vessels may be substantially identical or may differ in size or dimensions because of design limitations or fabrication issues.

In the broadest terms, the embodiments of the invention relate to a PSA system comprising a number of composite beds, N, of adsorbent material where N is one or more. Each of the N composite beds in the PSA system comprises adsorbent disposed in a number of vessels, n, where n is greater than one. The n vessels are arranged in a parallel flow configuration in which each vessel and the adsorbent therein receives a portion of the total gas flow into the composite bed and contributes a portion of the total gas flow out of the composite bed. In addition to the N composite beds, the PSA system also may have a number of conventional beds in which the adsorbent material is contained in a single vessel; in this embodiment, the PSA system is a combination of beds and composite beds.

As discussed above, it is desirable to compensate for performance differences among the vessels of a composite bed in a PSA systems having one or more composite beds. Exemplary methods to accomplish this are described below.

Figure 3:
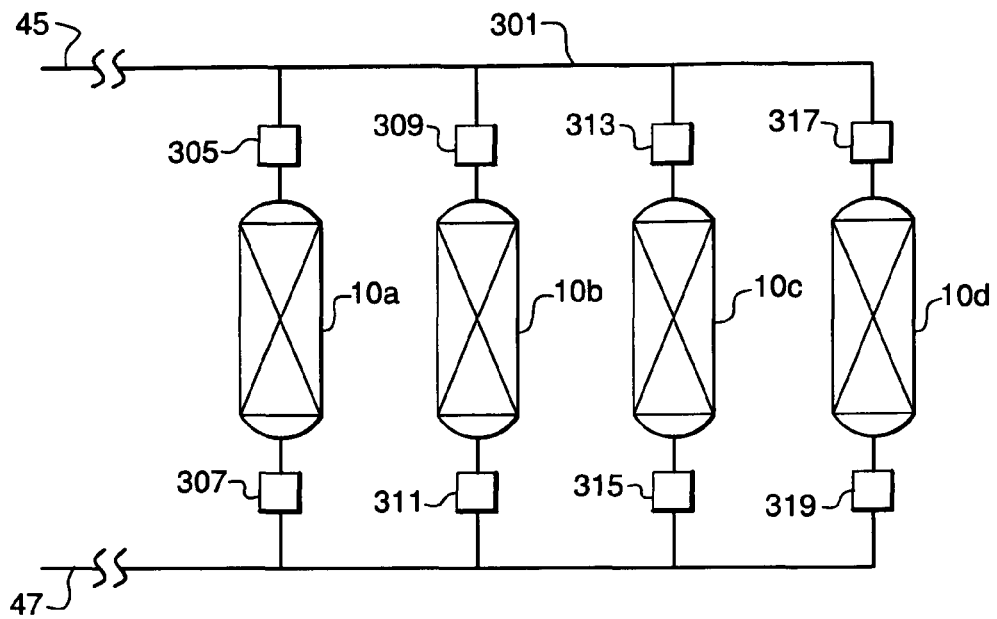
FIG. 3 is a schematic flow diagram of a multiple-vessel bed for use in the system of FIG. 1.

In the PSA system of FIG. 1, composite bed 10 may comprise four parallel vessels as illustrated as an example in FIG. 3. Vessels 10a, 10b, 10c, and 10d are installed in parallel and each vessel contains a portion of the adsorbent material in composite bed 10 such that the equivalent adsorbent of composite bed 10 is contained in parallel vessels 10a, 10b, 10c, and 10d. In this illustrative embodiment, vessels 10a, 10b, 10c, and 10d are connected at the product end by product manifold 301, which is connected to product line 45 at the product end of composite bed 10. Vessels 10a, 10b, 10c, and 10d are connected at the feed end by feed manifold 303, which is connected to feed line 47 at the feed end of composite bed 10. Manifolds 301 and 303 place vessels 10a, 10b, 10c, and 10d in a parallel flow configuration.

Any of the parallel vessels may be fitted with a flow restriction device at the feed end and/or the product end, and any number of parallel vessels greater than one may be used. In the example of FIG. 3, four vessels are used and each has a flow restriction device installed at the feed and product ends. Thus vessel 10a has flow restriction device 305 at the product end and flow restriction device 307 at the feed end, vessel 10b has flow restriction device 309 at the product end and flow restriction device 311 at the feed end, vessel 10c has flow restriction device 313 at the product end and flow restriction device 315 at the feed end, and vessel 10d has flow restriction device 317 at the product end and flow restriction device 319 at the feed end. In alternative embodiments, the flow restriction devices may be installed on either the feed end or the product end of the vessels.

The flow restriction devices may be selected from the group consisting of an orifice, an adjustable valve, a reduced-diameter pipe segment, and an adjustable-stop check valve. The adjustable valve may be a valve adapted for adjustment by hand or by a valve positioner system operated from a remote location. The valve positioner may be operated by a central process control system if desired. The adjustable-stop check valve is a check valve device in which the stop prevents the internal check mechanism from closing completely. The stop may be adjusted while the system is operating. When gas flow passes through an adjustable-stop check valve in one direction, the internal mechanism of the valve presents low restriction to flow and allows a relatively higher flow of gas in that direction. When gas flow passes through the valve in the reverse direction, the adjustable stop prevents the internal mechanism from closing completely, which allows flow to pass but with a greater restriction to flow, thereby allowing a relatively low flow of gas in the reverse direction. An example of an adjustable-stop check valve is the Rexroth Floreg® Flow Control Valve. The other flow restriction devices typically are changed when the PSA system is out of service; alternatively, these devices may be changed during PSA operation if individual vessels are fitted with isolation valves.

The degree of flow restriction of each device can be chosen as desired to allow setting the proper flow rates into and out of the feed and product ends of the vessels during applicable process cycle steps. The degree of flow restriction in each device is selected to obtain equivalent or nearly equivalent adsorption performance of vessels 10a, 10b, 10c, and 10d according to criteria described later. When the system is operated according to the cycle of FIG. 2 and Table 1, for example, a flow restriction device at the feed end of a vessel will affect the flow rate of gas to that vessel during the adsorption/make product and the feed pressurization steps and from the vessel during the evacuation and purge steps. Likewise, a flow restriction device at the product end of a vessel will affect the flow rate of gas from that vessel during the adsorption/make product step, the adsorption/make product/provide purge step, the provide pressure transfer and receive pressure transfer steps, and the provide purge and receive purge steps.

Figure 4:
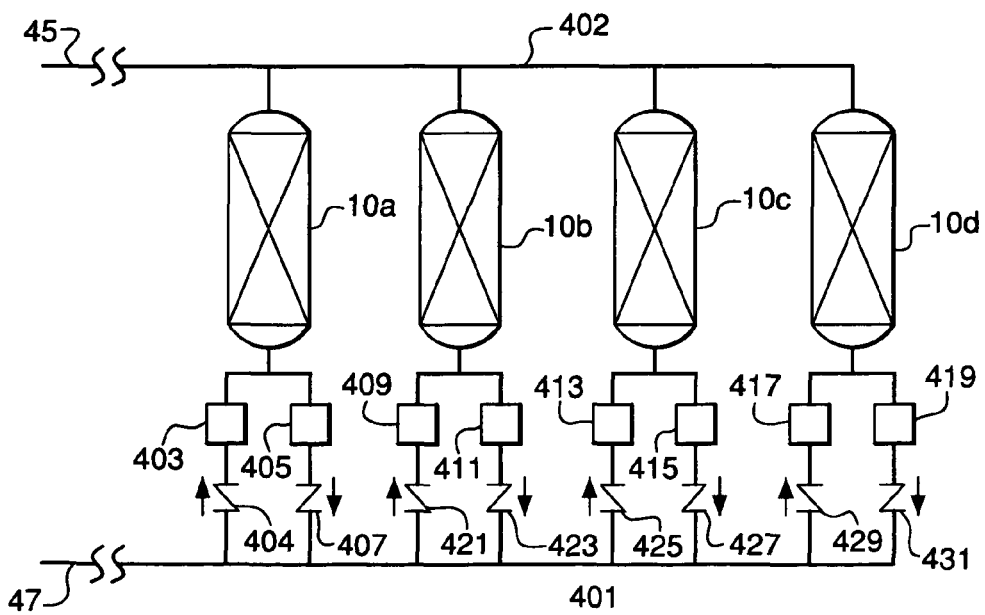
FIG. 4 is a schematic flow diagram of another multiple-vessel bed for use in the system of FIG. 1.

Alternative embodiments are possible to allow the setting of different gas flow rates during different selected cycle steps. One of these alternatives is illustrated in the example of FIG. 4 wherein a manifold is provided such that the feed end of each vessel can be fitted with for two parallel flow restriction devices, each device having an adjacent check valve to allow flow through the device in only one direction. In this embodiment, feed manifold 401 is connected to line 47 and product manifold 402 is connected to line 45. Vessel 10a is provided with flow restriction device 403 and check valve 404 that allows flow only into the feed end of vessel 10a, which flow occurs during the adsorption/make product and feed pressurization steps. Vessel 10a also is provided with flow restriction device 405 and check valve 407 that allows flow only from the feed end of vessel 10a, which flow occurs during the evacuation and purge steps of that composite bed. Analogous flow restriction devices 409, 411, 413, 415, 417, and 419 and check valves 421, 423, 425, 427, 429, and 431 are installed as shown at the feed ends of vessels 10b, 10c, and 10d, respectively. While flow restriction devices are not shown at the product ends of the vessels in the embodiment of FIG. 4, such devices may be used at the product ends of the vessels if desired in alternative embodiments.

Figure 5:
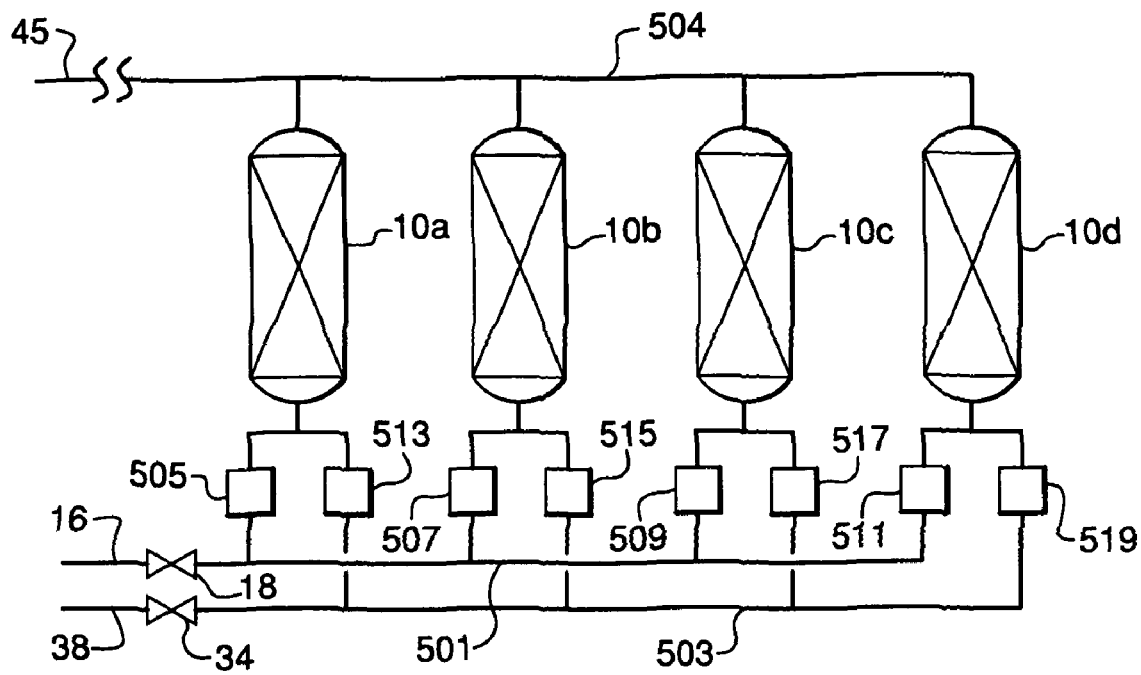
FIG. 5 is a schematic flow diagram of yet another alternative multiple-vessel bed for use in the system of FIG. 1.

Another embodiment is illustrated in the example of FIG. 5 in which two separate manifolds are provided at the feed ends of the vessels, wherein feed manifold 501 provides for feed gas introduction into the vessels and evacuation manifold 503 provides for withdrawal of evacuation and purge gas from the vessels. Feed manifold 501 is connected via valve 18 to feed manifold 16 and evacuation manifold 503 is connected via valve 34 to evacuation manifold 38. Product manifold 504 is connected to line 45 that is in flow communication with valves 26, 30, and 32. Feed manifold 501 allows for the installation of flow restriction devices 505, 507, 509, and 511, at the feed ends of vessels 10a, 10b, 10c, and 10d, respectively, wherein these devices affect the flow rate of feed gas into the respective vessels during the adsorption/make product and feed repressurization steps. Evacuation manifold 503 allows for the installation of flow restriction devices 513, 515, 517, and 519 as shown at the feed ends of vessels 10a, 10b, 10c, and 10d, respectively, wherein the devices affect the flow rates of gas from the vessel during the evacuation and purge steps. While flow restriction devices are not shown at the product ends of the vessels in the embodiment of FIG. 5, such devices may be used at the product ends of the vessels if desired in alternative embodiments.

Figure 6:
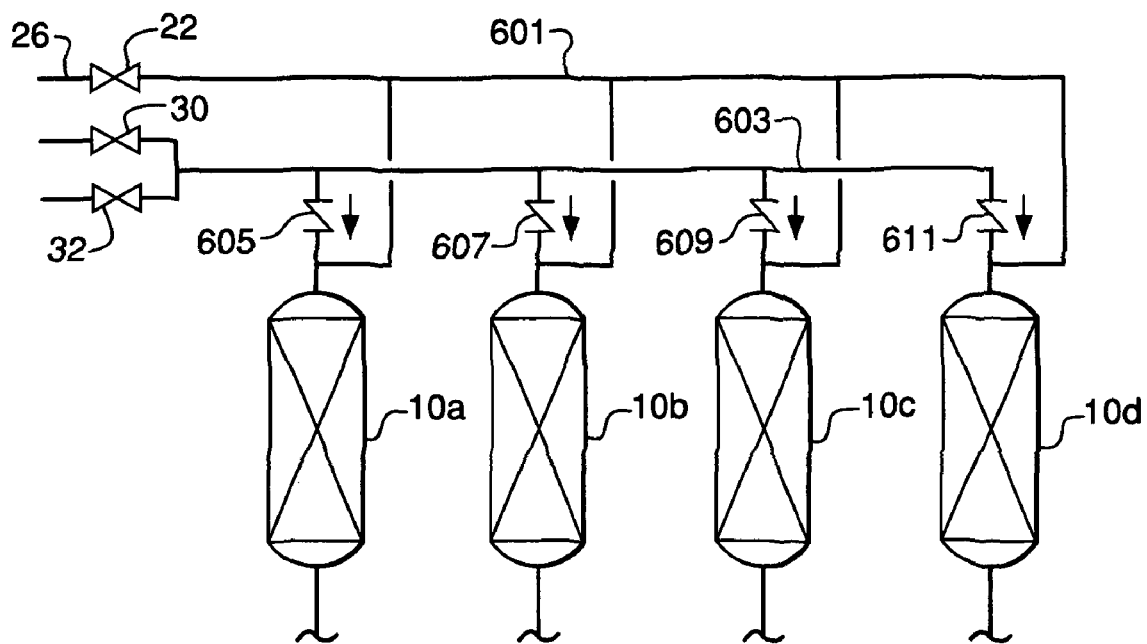
FIG. 6 is a schematic flow diagram of an alternative multiple-vessel bed for use in the system of FIG. 1.

Another embodiment is illustrated in the example of FIG. 6 in which two separate manifolds are provided at the product ends of the vessels, wherein manifold 601 provides for product gas withdrawal from the vessels and manifold 603 provides for the introduction of receive purge gas and receive pressure transfer gas into the vessels and the withdrawal of provide purge gas and provide pressure transfer gas from the vessels. Manifold 601 is connected via valve 22 to product manifold 26 and manifold 603 is connected to valves 30 and 32. Manifold 603 comprises adjustable-stop check valves 605, 607, 609, and 611 at the product ends of vessels 10a, 10b, 10c, and 10d, respectively. The embodiment of FIG. 6 allows free gas flow from the vessels during the adsorption/make product step and allows for selective flow restriction to and from the vessels during the provide pressure transfer and receive pressure transfer steps and the provide purge and receive purge steps. With this configuration, the flow restriction at the vessel product ends can be adjusted for each vessel for the provide purge steps and provide pressure transfer steps without affecting the flow restriction at the product ends during the receive purge and receiving pressure transfer steps, without affecting flow during the adsorption/make product step. Flow restriction devices may or may not be used at the feed ends of the vessels. Alternative embodiments may include flow restriction devices on manifold 601.

The flow restriction devices in any of the embodiments of FIGS. 3, 4, 5, and 6 may be used to set the gas flow rates for selected process steps in order to balance the adsorption performance of the multiple parallel vessels of each composite bed. Other configurations of flow restriction devices can be envisioned for use within the broad embodiments of the invention.

Balanced performance of the multiple vessels of a composite bed is achieved when the product gas streams from the adsorbent vessels in the bed are similar in product purity, i.e., when the concentrations of a selected component in the product gas streams vary by less than a maximum acceptable value. The achievement of balanced performance may be indicated, for example, by the time-averaged concentrations of the selected component during any step or steps in which product gas is withdrawn from the product end of each parallel vessel. The achievement of balanced performance may be indicated by other control parameters as discussed below.

Various control parameters may be monitored to determine when the vessels are in balanced operation or the degree to which any vessel is not in balanced operation with the other vessels. One control parameter is the concentration of a selected component in the product gas from each vessel which is chosen to represent product purity as described above. Other control parameters may include, for example, the concentration of a selected component in the purge effluent gas from any the vessel, the minimum or maximum concentration of a selected component in the purge effluent gas from any the vessel, the maximum or minimum concentration of a selected component in the void space of the adsorbent at a selected point in the vessel, and the differential pressure between two points in the vessel at a selected time during the sequential steps. Other alternative control parameters can be envisioned for monitoring vessel operation.

When used as a control parameter or as the criterion for balanced operation, the generic terms "concentration" or "gas concentration" mean any concentration that is (1) determined at a specific time in a selected PSA cycle step, and/or (2) time-averaged over the duration of that step, and/or (3) a maximum or minimum value during that step.

The control parameter used for monitoring vessel operation should be correlated with the criterion for balanced operation described above such that when the selected control parameter meets a specified set of operating conditions the parallel vessels of a composite bed meet the selected product gas composition criterion for balanced operation. When the control parameter is the product gas composition, correlation with the criterion for balanced operation is inherent. The correlation of product gas composition with other control parameters may be established experimentally for a given PSA system and cycle. Once the correlation is established, the control parameter may be used for subsequent operation monitoring.

The first step in balancing the adsorption performance for the parallel vessels of a composite bed is to select a control parameter, a specific sequential step (for example, one of the steps described above for the exemplary process cycle of Table 1), and a gas stream entering or exiting the vessel during the specific sequential step. The selection of a control parameter will depend upon the characteristics of the adsorbent, the gases to be separated, and the PSA process cycle used for the separation. Operating strategies using more than one control parameter may possible, depending on the gases being separated and the PSA process cycle being used. A desirable control parameter typically has any of the following characteristics: (a) shows reasonable sensitivity to changes in the balance of the adsorber vessel performance, (b) shows equality of the control parameter among the vessels when the performance among the vessels is balanced according to the above definition, (c) shows rapid response to changes in the vessel performance, and (d) is easily measured or calculated.

After a control parameter is selected and correlated with the criterion of balanced operation defined above, an operating strategy is defined to determine the actual process actions required to achieve balanced or substantially balanced operation of the one or more vessels of a composite bed. The operating strategy determines changes to be made to the flow restriction devices based on the measured control parameters in order to achieve the desired degree of balance among the vessels. The response of a control parameter in a vessel to a change in the flow restriction device in that vessel may be in one of two directions. In one operating scenario, the value of the control parameter in a vessel increases as the flow restriction device is made more restrictive, i.e., as the gas flow rate decreases. In the other operating scenario, the value of the control parameter in a vessel decreases as the flow restriction device is made more restrictive, i.e., as the gas flow rate decreases.

As an example, if the maximum pressure during the cycle is chosen as a control parameter, this parameter will decrease in value in a vessel if a flow restriction device on the inlet of that vessel is made more restrictive to reduce the flow of the inlet gas. This occurs because less feed gas will enter the vessel during the high pressure feed step. As another example, if the purity of the product exiting a vessel is selected as a control parameter, this control parameter will increase in value in a vessel if the flow restriction device on the outlet of that vessel is made more restrictive to reduce the outflow of gas from the vessel. This occurs because less product gas will exit the vessel during the make product step.

The actual response of a control parameter to changes in each of the flow restriction devices may be known from previous experience. If it is not known, it may be determined experimentally on the PSA system by making a change to the flow restriction device and monitoring the response of the control parameter to that change. This information then can be used to make further changes to the flow restriction devices to achieve operating balance among the vessels of the composite bed.

When a flow restriction device is made more or less restrictive to change the gas flow to or from a vessel, and a response occurs in a control parameter for that vessel, the response of the parameter will be the reverse in the other vessels in the composite bed. This is because the vessels of the composite bed each receive a portion of the total gas flow to the composite bed, and a change in the flow rate of gas to or from the one vessel will result in a change in the flow rates to or from the other vessels, but in the opposite direction. The magnitude of the control parameter response in each vessel may be different. Referring back to the example wherein the maximum composite bed pressure during the cycle is chosen as the control parameter, when the control parameter decreases in value in a vessel as a flow restriction device on the inlet of that vessel is made more restrictive to reduce the flow rate of gas into the vessel, if the other flow restriction devices (if any) on all of the vessels in the composite bed are unchanged, the value of the control parameter will rise in the other vessels because more feed gas will be diverted to them.

Once the response of the control variable to changes in each of the flow restriction devices is known, a strategy to balance the vessels in the composite bed is determined according to the scenarios described Table 2.

TABLE 2

Control Parameter and Operation Scenarios

| Characteristic Response of Control Parameter to Selected Gas Flow Rate for a Selected Sequential Step | Actual Operating Situation for a Selected Vessel of a Multiple-Vessel Composite Bed | Required Operating Change for the Selected Vessel of the Composite bed |
|---|---|---|
| Control parameter increases when flow rate is increased | Control parameter for a selected vessel is greater than the average of the control parameters for all vessels of the composite bed | Decrease selected gas flow rate |
| | Control parameter for a selected vessel is less than the average of the control parameters for all vessels of the composite bed | Increase selected gas flow rate |
| Control parameter decreases when flow rate is increased | Control parameter for a selected vessel is greater than the average of the control parameters for all vessels of the composite bed | Increase selected gas flow rate |
| | Control parameter for a selected vessel is less than the average of the control parameters for all vessels of the composite bed | Decrease selected gas flow rate |

As described above and as summarized in the left column of Table 2, there are two characteristic responses of a control parameter to a change in the gas flow rate through a selected flow restriction device, namely, (1) the control parameter increases when the flow rate is increased and (2) the control parameter decreases when the flow rate is increased. Once the values of the control parameter for all vessels are determined during actual PSA operation, two actual operating situations can occur for each of these two characteristic responses, namely, (a) the control parameter for a selected vessel is greater than the average of the control parameters for of all vessels of the composite bed and (b) the control parameter for a selected vessel is less than the average of the control parameters for of all vessels of the composite bed. As seen in the middle column of Table 2, for each of the operating situations (1)(a), (1)(b), (2)(a), and (2)(b) for a selected vessel, a specific operating change is required as listed in the right column of Table 2. These changes are as follows: for operating situation (1)(a), decrease the selected gas flow rate; for operating situation (1)(b), increase the selected gas flow rate; for operating situation (2)(a), increase the selected gas flow rate; and for operating situation (2)(b), decrease the selected gas flow rate.

If a flow restriction device on a vessel is at its position of least restriction, i.e., allows maximum flow, and if the logic in Table 2 indicates that the device should be made less restrictive to increase the flow rate, then the flow restriction devices on the other vessel or vessels of the composite bed should be made more restrictive to decrease the corresponding flow rates for that vessel or those vessels.

In general, the first step in balancing the performance of the vessels should be directed to the vessel or vessels showing the greatest deviation (positive or negative) of the control parameter from the average of the control parameters of the other vessels or for all of the vessels. This is because a vessel showing poor performance is at risk for breakthrough of the adsorbed components into the product stream. A small amount of breakthrough will reduce the product quality substantially, and preventing or correcting the breakthrough will show large benefits in production. On the other hand, for many PSA systems a vessel which is showing performance far better than the average of the vessels in the composite bed is needlessly making high quality product gas, and by bringing the quality of the product gas from that vessel closer to the average, the flow rate of the product from the vessel and thus the composite bed can be increased.

The number of flow restriction devices per vessel is not limited to a single device on the inlet and a single device on the outlet as shown in FIG. 3. For example, FIG. 4 shows an arrangement of four vessels in which a flow restriction device is installed at the feed end of each vessel to function when gas is flowing into feed end and a separate flow restriction device is installed on the feed end to function when gas is flowing from the feed end of the vessel. Check valves are employed to select which flow direction will occur through each flow restriction device. Other variations are discussed above with reference to FIGS. 5 and 6.

The invention claimed is:

1. A pressure swing adsorption process for the separation of a feed gas mixture containing two or more components, the process comprising
 (a) providing a pressure swing adsorption system comprising one or more composite beds, each composite bed comprising adsorbent material disposed in two or more vessels in parallel flow configuration, each vessel having a feed end and a product end;
 (b) performing cyclic sequential steps comprising
  (b1) introducing the feed gas mixture into the feed ends of two or more vessels of the composite bed and withdrawing product gas from the product ends of the two or more vessels of the composite bed,
  (b2) withdrawing gas at decreasing pressure from the feed ends of the two or more vessels of the composite bed,
  (b3) purging the composite bed by introducing purge gas into the product ends of the two or more vessels of the composite bed and withdrawing purge effluent gas from the feed ends of the two or more vessels of the composite bed, and
  (b4) introducing gas into the product ends and/or feed ends of the two or more vessels of the composite bed at increasing pressure; and
 (c) for any of the sequential steps, setting a flow rate or flow rates of one or more gases selected from the group consisting of
  (c1) gas introduced into the feed end or ends of any of the two or more vessels,
  (c2) gas introduced into the product end or ends of any of the two or more vessels,
  (c3) gas withdrawn from the feed end or ends of any of the two or more vessels, and
  (c4) gas withdrawn from the product end or ends of any of the two or more vessels.

2. The process of claim 1 wherein the flow rate is set or the flow rates are set to maintain the value of a selected control parameter for the two or more vessels such that
   (a) the absolute difference between the selected control parameters for any two of the two or more vessels is less than a predetermined value, or
   (b) the absolute difference between the selected control parameter from each of the two or more vessels of the composite bed and the average of the control parameters from each of the two or more vessels of the composite bed is less than a predetermined value,
   wherein the control parameter for each vessel is selected from the group consisting of
   (1) the time-average concentration of a selected component in the product gas from the vessel;
   (2) the minimum or maximum concentration of a selected component in the product gas from the vessel;
   (3) the time-average of the concentration of a selected component in the purge effluent gas from the vessel;
   (4) the minimum or maximum concentration of a selected component in the purge effluent gas from the vessel;
   (5) the minimum or maximum concentration of a selected component in the void space of the adsorbent at a selected point in the vessel;
   (6) the differential pressure between two points in the vessel at a selected time during the sequential steps;
   (7) the minimum or maximum temperature at a selected point in the vessels during the sequential steps; and
   (8) the minimum or maximum pressure at a selected point in the vessel during the sequential steps.

3. The process of claim 1 comprising two or more composite beds of adsorbent material.

4. The process of claim 1 wherein the feed gas mixture is air and the product gas contains greater than 85 vol % oxygen.

5. The process of claim 1 consisting of 2 composite beds of adsorbent material, wherein each composite bed consists of 2 to 20 vessels.

6. The process of claim 4 wherein the flow rate is set or the flow rates are set to maintain the value of a selected control parameter for the two or more vessels and wherein the selected control parameter for each vessel is the time-average concentration of oxygen in the product gas withdrawn from the outlet of that vessel.

7. A pressure swing adsorption process for the separation of a feed gas mixture containing two or more components, the process comprising
   (a) providing a pressure swing adsorption system comprising one or more composite beds, each composite bed comprising adsorbent material disposed in two or more vessels in parallel flow configuration, each vessel having a feed end and a product end;
   (b) performing cyclic sequential steps comprising
      (b1) introducing the feed gas mixture into the feed ends of two or more vessels of a composite bed and withdrawing product gas from the product ends of the two or more vessels of the composite bed,
      (b2) withdrawing gas at decreasing pressure from the feed ends of the two or more vessels of the composite bed,
      (b3) purging the composite bed by introducing purge gas into the product ends of the two or more vessels of the composite bed and withdrawing purge effluent gas from the feed ends of the two or more vessels of the composite bed, and
      (b4) introducing gas into the product ends and/or feed ends of the two or more vessels of the composite bed at increasing pressure;
   (c) selecting a control parameter; and
   (d) for any of the sequential steps, setting the flow rate or flow rates of one or more gases selected from the group consisting of
      (d1) gas introduced into the feed end or ends of any of the two or more vessels,
      (d2) gas introduced into the product end or ends of any of the two or more vessels,
      (d3) gas withdrawn from the feed end or ends of any of the two or more vessels, and
      (d4) gas withdrawn from the product end or ends of any of the two or more vessels,
   wherein the flow rate is set or the flow rates are set to maintain the values of the control parameter for selected vessels of the two or more vessels such that the absolute difference between the values for any two of the selected vessels is less than a predetermined value.

8. The process of claim 7 wherein the control parameter is selected from the group consisting of
   (1) the time-average concentration of a selected component in the product gas from the vessel;
   (2) the minimum or maximum concentration of a selected component in the product gas from the vessel;
   (3) the time-average of the concentration of a selected component in the purge effluent gas from the vessel;
   (4) the minimum or maximum concentration of a selected component in the purge effluent gas from the vessel;
   (5) the maximum or minimum concentration of a selected component in the void space of the adsorbent at a selected point in the vessel;
   (6) the differential pressure between two points in the vessel at a selected time during the sequential steps;
   (7) the minimum or maximum temperature at a selected point in the vessels during the sequential steps; and
   (8) the minimum or maximum pressure at a selected point in the vessel during the sequential steps.

9. The process of claim 8 wherein the feed gas mixture is air and the product gas contains greater than 85 vol % oxygen.

10. The process of claim 9 wherein the control parameter is the time-average concentration of oxygen in the product gas withdrawn from the outlet of the vessel.

11. A pressure swing adsorption process for the separation of a feed gas containing two or more components, the process comprising
   (a) providing a pressure swing adsorption system comprising one or more composite beds, each composite bed comprising adsorbent material disposed in two or more vessels in parallel flow configuration, each vessel having a feed end and a product end;
   (b) performing cyclic sequential steps comprising
      (b1) introducing feed gas into the feed ends of two or more vessels of a composite bed and withdrawing product gas from the product ends of the two or more vessels of the composite bed,
      (b2) withdrawing gas at decreasing pressure from the feed ends of the two or more vessels of the composite bed,
      (b3) purging the composite bed by introducing purge gas into the product ends of the two or more vessels of the composite bed and withdrawing purge effluent gas from the feed ends of the two or more vessels of the composite bed, and
      (b4) introducing gas into the product ends and/or feed ends of the two or more vessels of the composite bed at increasing pressure;

(c) selecting a control parameter, a specific sequential step, and a gas stream entering any vessel or exiting any vessel during the specific sequential step;

(d) determining whether the control parameter increases or decreases when the flow rate is increased for the selected gas stream entering the vessel or exiting the vessel during the specific sequential step;

(e) while performing the cyclic sequential steps, determining the value of the control parameter for each vessel and the average value of the control parameter for all vessels of the composite bed; and (f) if the control parameter increases when the flow rate of the gas stream entering or exiting a vessel is increased during the specific sequential step as determined in (d) and if the value of the control parameter for the selected vessel is greater than the average value of the control parameter for all vessels of the composite bed during the specific sequential step, decreasing the gas flow rate entering or exiting the selected vessel; or (g) if the control parameter increases when the flow rate of the gas stream entering or exiting a vessel is increased during the specific sequential step as determined in (d) and if the value of the control parameter for a selected vessel is less than the average value of the control parameter for all vessels of the composite bed during the specific sequential step, increasing the gas flow rate entering or exiting the selected vessel; or (h) if the control parameter decreases when the flow rate of the gas stream entering or exiting a vessel is increased during the specific sequential step as determined in (d) and if the value of the control parameter for a selected vessel is greater than the average value of the control parameter for all vessels of the composite bed during the specific sequential step, increasing the gas flow rate entering or exiting the selected vessel; or (i) if the control parameter decreases when the flow rate of the gas stream entering or exiting a vessel is increased during the specific sequential step as determined in (d) and if the value of the control parameter for a selected vessel is less than the average value of the control parameter for all vessels of the composite bed during the specific sequential step, decreasing the gas flow rate entering or exiting the selected vessel.

12. The process of claim 11 wherein the control parameter is selected from the group consisting of (1) the time-average concentration of a selected component in the product gas from the vessel;

(2) the minimum or maximum concentration of a selected component in the product gas from the vessel;

(3) the time-average of the concentration of a selected component in the purge effluent gas from the vessel;

(4) the minimum or maximum concentration of a selected component in the purge effluent gas from the vessel;

(5) the maximum or minimum concentration of a selected component in the void space of the adsorbent at a selected point in the vessel;

(6) the differential pressure between two points in the vessel at a selected time during the sequential steps;

(7) the minimum or maximum temperature at a selected point in the vessel during the sequential steps; and (8) the minimum or maximum pressure at a selected point in the vessel during the sequential steps.

* * * * *